United States Patent [19]

Izumitani et al.

[11] Patent Number: 5,358,725
[45] Date of Patent: Oct. 25, 1994

[54] METHOD AND DEVICE FOR EXTRACTING EFFECTIVE INGREDIENTS FROM DRIED PLANT MATERIALS

[75] Inventors: Maremitsu Izumitani, Kokubunji; Yoshimi Sawada, Tachikawa, both of Japan

[73] Assignee: McCoffee Co., Ltd., Tokyo, Japan

[21] Appl. No.: 85,985

[22] Filed: Jul. 1, 1993

[30] Foreign Application Priority Data

Jul. 1, 1992 [JP] Japan .................................. 4-197788

[51] Int. Cl.⁵ .......................... A23F 3/00; A23F 5/00; A47J 31/00
[52] U.S. Cl. ...................................... 426/238; 99/287; 99/290; 99/300; 426/433; 426/435
[58] Field of Search ............... 426/238, 433, 435, 519; 99/287, 290, 296, 298, 300, 323, 451

[56] References Cited

U.S. PATENT DOCUMENTS 4,983,412  1/1991  Hauslein ........................ 426/238

*Primary Examiner*—George Yeung
*Attorney, Agent, or Firm*—Edward H. Renner

[57] ABSTRACT

A method for extracting the effective ingredients from dried plant materials such as coffee, black tea, green tea, herbs, and the like as a concentrated liquid, and a device for implementing that method, are disclosed whereby an effective ingredient is extracted as an extracted liquid with high clarity and high concentration from dried plant material in a short time without loss of aroma and flavor without extracting the unpleasant bitter or astringent taste resulting from the extraction of tannin, while also sterilizing the extracted liquid.

5 Claims, 1 Drawing Sheet

METHOD AND DEVICE FOR EXTRACTING EFFECTIVE INGREDIENTS FROM DRIED PLANT MATERIALS

BACKGROUND OF THE INVENTION

1. Field of the Invention

The present invention relates to a method for extracting the effective ingredients from dried plant materials such as coffee, black tea, green tea, herbs, and the like as a concentrated liquid, and to a device for implementing that method.

2. Description of the Prior Art

Conventionally, the most basic method for extracting the effective ingredients from dried plant materials such as coffee, black tea, green tea, herbs, and the like as a beverage involves adding boiling water to the pulverized dried plant materials and digesting, followed by filtration of the digested material. At the present time, this method is commonly used both industrially and in the home. In addition, there are also many cases in which this method is employed on a large scale for large volume production in a factory in order to market the extracted liquid as a canned or bottled beverage.

Among the dried plant materials such as black tea, green tea, and herbs there are no great differences in the use of this extraction method. However, various different types of methods have been conventionally used for extraction of coffee. Specifically, these extraction methods/or coffee may be broadly classified into extraction using water at high temperature as outlined above, and extraction using water at normal temperature.

Commonly known methods for extraction using water at normal temperature include a water drip system and a Dutch system. The methods using water at normal temperature cause no deterioration in the raw material. A liquid coffee can be obtained with an amber color of high clarity while at the same time maintaining a superior flavor and odor without loss of the unique fragrance of coffee. However, there is a major drawback inasmuch as the extraction takes a long time, normally ranging from five hours to about fifteen hours. In particular, this method is not suitable for large volume production as used industrially. Also, in order to sell the product as a beverage it must be sterilized to prevent decomposition resulting from preservability problems.

On the other hand, commonly known methods for extraction of liquid coffee using water at high temperature include a jet system, a syphon system, a drip system, a decoction system, and the like, These methods make short-time extraction possible, but because of changes in the raw material caused by the high temperatures there is a tendency toward loss of the unique fragrance of coffee and for production of turbidity in the liquid coffee resulting from the extraction of albumin, and an increase in the unpleasant bitter or astringent taste resulting from the extraction of tannin, such as chlorogenic acid, caffeic acid, and quinic acid.

SUMMARY OF THE INVENTION

It is desirable that extraction be carried out under low temperature so that the aroma and flavor of the effective ingredient in the dried plant material not be lost. However, in the conventional methods the extraction efficiency is extremely low and there are problems in preservation.

Accordingly, an object of the present invention is to provide, with due consideration to the drawbacks of such conventional technology, both a method, and a device for implementing this method, for extracting an effective ingredient from dried plant material, as an extracted liquid with high clarity and high concentration, under low temperatures in a short time without loss of the aroma and flavor of the effective ingredient, and without an unpleasant bitter or astringent taste resulting from the extraction of part of the tannin, while also sterilizing the extracted liquid.

This object is achieved in the present invention by the provision of a method for extracting an effective ingredient from dried plant material wherein the effective ingredient in the dried plant material is extracted as a concentrated liquid by adding water at 40° C. to 60° C. to the dried, pulverized plant material, applying ultrasonic waves at a frequency in the range of 100 to 500 KHz, then filtering under a pressure reduction of 20 to 60 Torr. In addition, this object is further achieved in the present invention by the provision of a device for extracting an effective ingredient from dried plant material comprising an ultrasonic wave application section for applying ultrasonic waves while flooding the dried plant raw material with water; and a filtration extraction section for filtering and extracting the effective ingredient while flooding water onto the dried plant raw material to which ultrasonic waves have been applied.

By adding water at 40° C. to 60° C. to the dried, pulverized plant material, applying ultrasonic waves at a frequency in the range of 100 to 500 KHz, with agitation, and filtering under a pressure reduction of 20 to 60 Tort, the activity of the water component is increased, even with water at normal temperatures, and absorption/peeling of the effective ingredient of the dried plant material is carried out from the cavitation effect of the ultrasonic waves. In this case, when the frequency of the ultrasonic waves is 100 KHz or less, tannin is easily extracted, and, in addition, when the frequency of the ultrasonic waves is 500 KHz or greater, there is danger that the molecule of the dried plant material will be broken down. It is therefore desirable that the frequency of the ultrasonic waves be in the range of 100 to 500 KHz. On the other hand, because the extraction is carried out with water at normal temperatures, changes in the raw material caused by heat can be prevented, and it is possible to extract a concentrated liquid with a high degree of clarity without causing loss of flavor and odor. Further, a sterilization effect can be provided by applying the ultrasonic waves.

In addition, because the extraction device is constructed so that the ultrasonic waves are applied indirectly through a water chamber while agitating the raw material, it is possible to cause the ultrasonic wave oscillations to be diffused and applied uniformly to the raw material.

BRIEF DESCRIPTION OF THE DRAWINGS

These and other objects, features, and advantages of the present invention will become more apparent from the following description of the preferred embodiments taken in conjunction with the accompanying drawing, in which.

DETAILED DESCRIPTION OF THE PREFERRED EMBODIMENTS

Figure 1:
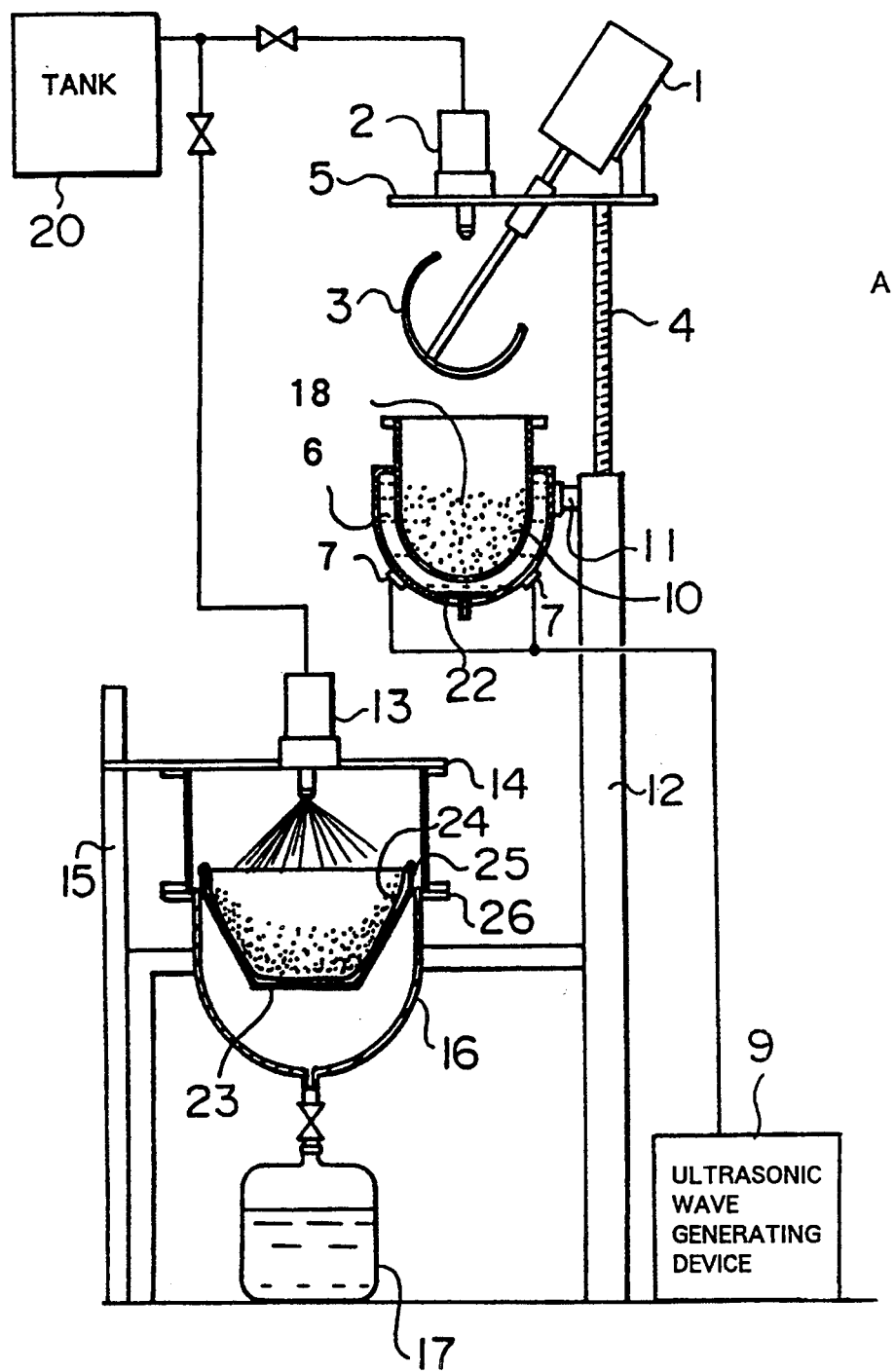
FIG. 1 is a sectional view of the main parts of an extraction device for implementing the process of the present invention.

An embodiment of the present invention will now be explained with reference to the drawing.

FIG. 1 is a sectional view of the main parts of an extraction device for implementing the method of the present invention for extracting the effective ingredient from the dried plant material, which is particularly suitable for the extraction of coffee.

The extraction device shown in FIG. 1 comprises an ultrasonic wave application section A and a filtration extraction section B.

The ultrasonic wave application section A comprises a coverplate section 5 provided with an arc-shaped agitator 3, a motor 1 for rotating the agitator 3, and a rotary nozzle 2 for providing a water-shower; and a stainless steel, hemispherical vessel 22 of double-walled construction comprising, in turn, an outer water chamber 6 and an inner raw material storage section 10, with four ultrasonic wave elements 7 mounted on the outer surface of the water chamber 6. Water is filled into the water chamber 6 and the ultrasonic wave elements 7, which may be conventional transducers, are activated by a signal from a separately positioned ultrasonic wave generating device 9, which may be a conventional electronic signal generator as is known in the art, so that ultrasonic wave oscillations occur.

The agitator 3 and the rotary nozzle 2 are mounted on a jack 4 provided on the coverplate section 5 and therefore can be moved vertically and set at an optional position. The vessel 22 is mounted on a column 12 through a rotary shaft 11, and can be rotated 90° downward for easy transfer of the raw material into the filtration extraction section B in the lower part of the device.

The filtration extraction section B comprises a coverplate section 14 on which is mounted a rotary nozzle 13 for applying a shower of extraction water at a low temperature of 40° to 60° C. from a tank 20; a hemispherical stainless steel filter apparatus 16; and a receiving vessel 17 for receiving the extracted liquid. The coverplate section 14 is mounted on a column 15 in a manner allowing 180©rotation in a horizontal plane around the column 15 as a shaft. A perforated metal section 23 is mounted on the inside of the filter apparatus 16. A filter cloth 24 in the form of a flannel bag hangs down on the inside of the perforated metal section 23, secured by a clip 25. Also, a vapor vent 26 is provided at one point on the side surface of the filter apparatus 16 to reduce the inner pressure. The extracted liquid receiving vessel 17 is fabricated from a clear glass which is highly vacuum-resistant, allowing ready observation of the density and color of the extracted coffee liquid.

In extracting the effective ingredient from coffee by means of the present invention, roasted, powdered coffee is first filled into the raw material storage section 10. The cover section 5 is then lowered over the inlet of the raw material storage section 10 and secured. Next, a shower of water at 40° to 60° C. from the rotary nozzle 2 is sprayed onto the raw material while the raw material is agitated by the rotation of the agitator 3 driven by the motor 1. The water is added until the weight of water is almost equivalent to the weight of the raw material, then the water addition and agitation is halted at the point where the raw material achieves a uniform moisture content. After the material has been allowed to sit for about 10 minutes under these conditions, the agitator is once again started and simultaneously ultrasonic waves in a frequency range of 100 to 400 KHz are applied for about 10 minutes. At this time, the application of the ultrasonic waves indirectly through the water in the water chamber 6 is to diffuse the oscillations of the ultrasonic waves to ensure uniform application to the raw material by passing through the water. In addition, the ultrasonic waves are uniformly applied to the raw material by also agitating the raw material.

After completion of the ultrasonic wave application, the raw material is transferred into the filter apparatus 16. The extraction is carried out in the filter apparatus 16 under a pressure reduction of 20 to 60 Tort while showering water onto the raw material from the rotary nozzle 13. The extracted coffee liquid is continuously transferred dropwise into the extracted liquid receiving vessel 17. The water shower is halted at the point where the color of the extracted liquid becomes light. As a result, a coffee liquid at a density five to six times that of a normal coffee liquid is obtained in the extracted liquid receiving vessel 17. By applying ultrasonic waves of high frequency to the raw material storage section 10, sterilization can be effected simultaneously with extraction.

Further, the device illustrated in FIG. 1 is fabricated with the ultrasonic wave application section and the filtration extraction section formed separately. However, in order to implement the method of the present invention, a device in which the ultrasonic wave application section and the filtration extraction section are integrally formed so that extraction is carried out while applying the ultrasonic waves is also acceptable, and is suitable for the extraction of black tea, green tea, and the like.

The present invention, provides the following effect by means of the method and the device outlined in the foregoing explanation.

An effective ingredient is extracted from dried plant material as an extracted liquid with high clarity and high concentration in a short time without loss of aroma and flavor, and without extracting the unpleasant bitter or astringent taste resulting from the extraction of tannin, while the extracted liquid is also sterilized.

The present invention is also applicable for extracting a relish such as glutamic acid or inosinic acid from dried fishes, such as dried bonito, and for extracting soup stock from meat.

What is claimed is:

1. A method for extracting an effective ingredient from dried plant material comprising extracting the effective ingredient as a concentrated liquid by adding water at 40° C. to 60° C. to the dried, plant material, applying ultrasonic waves at a frequency in the range of 100 to 500 KHz to the mixture of plant material and water, and filtering under a pressure reduction of 20 to 60 Torr to separate the effective ingredient contained therein.

2. A device for extracting an effective ingredient from dried plant material comprising:

a first section having means for containing a dried plant raw material and means for applying ultrasonic waves to the dried plant raw material, the first section also having means for showing water on the dried plant material contained in the containing means; and the device also having a second section having means for filtering and extracting the effective ingredient while showing water on the dried plant raw material to which ultrasonic waves [are being]have been applied.

3. A device for extracting an effective ingredient from dried plant material according to claim 2 wherein the section and the second section are integrally formed in a unitary structure.

4. A device for extracting an effective ingredient from dried plant raw material comprising:
- a vessel of double-walled construction comprising, in turn, an outer water chamber having an outer wall and an inner dried plant raw material storage section, wherein ultrasonic wave generating elements are installed on the outer wall of the water chamber;
- a showering nozzle for showering water into the vessel;
- an agitator for agitating the dried plant raw material within the vessel;
- a filter for filtering the effective ingredient from the dried plant raw material to which ultrasonic waves are applied in the vessel;
- a showering nozzle for showering water into the filter during filtration; and
- a receiving vessel for storing the filtered effective ingredient.

5. A method of selectively and rapidly extracting concentrated essences of dried plant material selected from the group consisting of black tea, green tea and coffee comprising contacting the dried plant material with water at a temperature of between about 40° to 60° C., and applying ultrasonic vibrations to the mixture, the vibrations being applied at a frequency of between about 100 to 500 $KH_2$, the extraction being effective to separate the desirable essences of the dried plant material from the dried plant material with minimal removal of compounds producing undesirable odor and taste, and filtering the extracted aqueous mixture of essences with a pressure reduction of between about 20 to 60 Torr.

* * * * *